United States Patent
Tanabe et al.

(10) Patent No.: US 9,604,385 B2
(45) Date of Patent: Mar. 28, 2017

(54) ELECTRIC TRIMMER

(71) Applicant: RYOBI LTD., Fuchu-shi, Hiroshima (JP)

(72) Inventors: Yasuhiro Tanabe, Fuchu (JP); Atsuhito Okada, Fuchu (JP); Yasuo Wada, Fuchu (JP)

(73) Assignee: RYOBI LTD., Fuchu-Shi, Hiroshima (JP)

( * ) Notice: Subject to any disclaimer, the term of this patent is extended or adjusted under 35 U.S.C. 154(b) by 213 days.

(21) Appl. No.: 14/433,963

(22) PCT Filed: Oct. 18, 2012

(86) PCT No.: PCT/JP2012/006664
§ 371 (c)(1),
(2) Date: Apr. 7, 2015

(87) PCT Pub. No.: WO2014/061061
PCT Pub. Date: Apr. 24, 2014

(65) Prior Publication Data
US 2015/0258704 A1    Sep. 17, 2015

(51) Int. Cl.
*B27C 5/10* (2006.01)
*B23C 1/20* (2006.01)
*B25F 5/02* (2006.01)

(52) U.S. Cl.
CPC .............. *B27C 5/10* (2013.01); *B23C 1/20* (2013.01); *B25F 5/021* (2013.01); *Y10T 409/306608* (2015.01)

(58) Field of Classification Search
CPC .... Y10T 409/306608; B27C 5/10; B23C 1/20
See application file for complete search history.

(56) References Cited

U.S. PATENT DOCUMENTS

| 7,121,775 B2 | 10/2006 | Onose et al. |
| 7,552,749 B2 * | 6/2009 | Kageler .................. B27C 5/10 144/136.95 |

(Continued)

FOREIGN PATENT DOCUMENTS

| JP | 2005-305683 A | 11/2005 |
| JP | 2011-213096 A | 10/2011 |

OTHER PUBLICATIONS

PCT/ISA/210, "International Search Report for PCT/JP2012/006664," Dec. 25, 2012.

(Continued)

*Primary Examiner* — Daniel Howell
(74) *Attorney, Agent, or Firm* — Manabu Kanesaka

(57) ABSTRACT

An electric trimmer includes: a base; and a trimmer main body configured capable of sliding movement in an axial direction of the base. The base includes a slit that extends in the axial direction and is open, and the base also includes a fixing releasing mechanism disposed so as to straddle both end portions of the slit. Operating the fixing releasing mechanism to reduce a distance between the both end portions of the slit enables clamping of the trimmer main body by the base to be performed. The fixing releasing mechanism is formed as a toggle mechanism that is configured by a combination of three support points and two links, and the fixing releasing mechanism has a shape which follows an outer peripheral surface of the base. Therefore, this electric trimmer includes high operability, strong impact resistance characteristics, and excellent maintenance properties.

5 Claims, 13 Drawing Sheets

(56) References Cited

U.S. PATENT DOCUMENTS

| | | | | |
|---|---|---|---|---|
| 7,900,662 | B2 * | 3/2011 | Wall | B27C 5/10 |
| | | | | 144/136.95 |
| 7,975,737 | B2 * | 7/2011 | Griffin | B27C 5/02 |
| | | | | 144/136.95 |
| 8,087,437 | B2 * | 1/2012 | Goddard | B25F 5/003 |
| | | | | 144/136.95 |
| 8,747,036 | B2 * | 6/2014 | Kato | B25F 5/021 |
| | | | | 144/136.95 |
| 9,022,705 | B2 * | 5/2015 | Shibata | B27C 5/10 |
| | | | | 144/154.5 |
| 9,346,144 | B2 * | 5/2016 | Tan | B23Q 9/0028 |
| 2010/0206434 | A1 | 8/2010 | Pozgay et al. | |
| 2012/0241048 | A1 * | 9/2012 | Kato | B25F 5/021 |
| | | | | 144/136.95 |

OTHER PUBLICATIONS

Japan Patent Office, "Notification of Reason(s) for Refusal for Japanese Patent Application No. 2014-541819," Dec. 15, 2015.

* cited by examiner (a)

(b)

105

112b

ELECTRIC TRIMMER

RELATED APPLICATIONS

The present application is National Phase of International Application No. PCT/JP2012/006664 filed Oct. 18, 2012, the disclosure of which is hereby incorporated by reference herein in its entirety.

TECHNICAL FIELD

The present invention relates to an electric trimmer, specifically, to an electric trimmer in which a fixing releasing mechanism employed when fixing a trimmer main body at an arbitrary position of a base has been improved.

BACKGROUND ART

Generally, when performing groove processing or chamfering processing of an edge portion on a material to be cut, an electric tool called an electric trimmer is used. This kind of electric trimmer is configured to include, for example: a trimmer main body in which a drive motor is housed; a bit which can be attached/detached to/from the trimmer main body and which is rotatably driven by the drive motor; and a base that grips the trimmer main body to be capable of sliding movement in an axial direction. The base is a member that acts as a reference of the electric trimmer. In addition, disposed at an upper end position of the base is a ring that is only allowed to undergo rotatory motion at said upper end position. An inner peripheral surface of the ring has formed thereon a screw thread or a thread groove. On the other hand, an outer peripheral surface of the trimmer main body has formed thereon a thread groove or a screw thread that threads with the screw thread or the thread groove of the ring. The ring and the trimmer main body are threaded with each other, hence if the ring is rotated, the trimmer main body undergoes sliding movement in the axial direction of the base according to that rotary motion, and positional adjustment of the bit with respect to the base is performed.

A conventional electric trimmer having the above-mentioned basic configuration makes it possible for the bit to rotate by rotating the drive motor, whereby groove processing or chamfering processing of an edge portion can be performed on a material to be cut. Moreover, since the trimmer main body can be caused to undergo sliding movement in an axial direction with respect to the base and a cutting depth of the bit can be adjusted, it is made possible to easily perform groove processing of a desired depth.

Incidentally, in order to fix the trimmer main body at an arbitrary position of the base, installation of a fixing releasing mechanism is essential. For example, Patent Document 1 listed below describes an embodiment in which a lever type fixing releasing mechanism is provided to a base surrounding a trimmer main body (in Patent Document 1, the trimmer main body is indicated as a "cylindrical housing").

PRIOR ART DOCUMENT

PATENT DOCUMENT

[Patent Document 1] JP 2005-305683 A

DISCLOSURE OF INVENTION

Problems to be Solved by the Invention

However, a conventional fixing releasing mechanism represented by the embodiment described in the above-listed Patent Document 1 had an extremely large external form compared to the electric trimmer and deteriorated operability of the electric trimmer. In particular, from an application of the electric trimmer, there are many cases where an operator grips a trunk portion to operate the electric trimmer, hence a large-scale lever type fixing releasing mechanism was a large obstacle to operation.

Moreover, the lever type fixing releasing mechanism described in Patent Document 1 has an extremely large operating angle of the lever, hence such a configuration was also a factor deteriorating operability.

Furthermore, when the lever type fixing releasing mechanism described in Patent Document 1 is in a released state, the lever is in a state of protruding from the trunk portion, hence there was a risk that when, for example, a strong force is applied to a tip of the lever due to dropping, and so on, the lever easily gets damaged.

Still further, the fixing releasing mechanism described in Patent Document 1 adopted a cam mechanism, but this cam mechanism was formed integrally with the lever. Therefore, there was a shortcoming that, supposing abrasion has occurred in the cam mechanism, it is necessary to replace the cam mechanism together with the lever. That is, an improvement for reducing running costs of maintenance, and so on, was desired of the electric trimmer according to the conventional technology.

The present invention was made to solve the various problems existing in the above-mentioned conventional technology, and an object of the present invention is to achieve an improvement in a fixing releasing mechanism employed for fixing a trimmer main body at an arbitrary position of a base, and thereby provide an electric trimmer comprising a new fixing releasing mechanism which improves operability by achievement of compacting, is resistant to external impact, and also has excellent maintenance properties.

Means for Solving the Problems

The present invention will be described below. Note that in order to facilitate understanding of the present invention, reference numerals of the attached drawings will be appended in brackets, but the present invention is not thereby limited to the illustrated forms.

An electric trimmer (10) according to the present invention is characterized in comprising: a base (20) acting as a reference; and a trimmer main body (40) configured capable of sliding movement in an axial direction of the base (20), the base (20) comprising a slit (21c) that extends in the axial direction and is open, and the base (20) also comprising a fixing releasing mechanism (50 (70, 90)) disposed so as to straddle both end portions (21a, 21b) of the slit (21c), operating the fixing releasing mechanism (50 (70, 90)) to reduce a distance between the both end portions (21a, 21b) of the slit (21c) causing clamping of the trimmer main body (40) by the base (20) to be performed, and the fixing releasing mechanism (50 (70, 90)) being formed as a toggle mechanism that is configured by a combination of three support points (51a, 51b (91b), 51c (81c, 131c)) and two links (52a (82a, 92a, 132a), 52b (92b, 112b, 132b)), and the fixing releasing mechanism (50 (70, 90)) being configured having a shape which follows an outer peripheral surface of the base (20).

The electric trimmer (10) according to the present invention may be configured such that the fixing releasing mechanism (50 (70, 90)) comprises: a first support point portion (51a) installed on a side of one end portion (21a) of the both end portions of the slit (21c); a first link portion (52a (82a, 92a, 132a)) installed tiltably with respect to the first support point portion (51a); a second support point portion (51b (91b)) installed on a side of the other end portion (21b) of the both end portions of the slit (21c); a second link portion (52b (92b, 112b, 132b)) installed tiltably with respect to the second support point portion (51b (91b)); and a third support point portion (51c (81c, 131c)) that links and connects the first link portion (52a (82a, 92a, 132a)) and the second link portion (52b (92b, 112b, 132b)) in a tiltable state, and the electric trimmer (10) according to the present invention may be configured such that in a released state of the fixing releasing mechanism (50 (70, 90)), the third support point portion (51c (81c, 131c)) can be disposed in a position most distant from the base (20), when the first link portion (52a (82a, 92a, 132a)) or the second link portion (52b (92b, 112b, 132b)) is tilted so as to approach the base (20) and the third support point portion (51c (81c, 131c)) has arrived on an extended line of a straight line joining the first support point portion (51a) and the second support point portion (51b (91b)), a dead point at which there occurs transition from the released state to a fixed state of the fixing releasing mechanism (50 (70, 90)) is reached, and further tilting the first link portion (52a (82a, 92a, 132a)) or the second link portion (52b (92b, 112b, 132b)) from a position of the dead point so as to approach the base (20) causes transition to the fixed state of the fixing releasing mechanism (50 (70, 90)) to occur.

Moreover, in the electric trimmer (10) according to the present embodiment, it is preferable to provide an adjusting mechanism (55 (85)) for adjusting a relative distance between the third support point portion (51c (81c, 131c)) and the first support point portion (51a) or the second support point portion (51b (91b)).

Furthermore, in the electric trimmer (10) according to the present embodiment, it is possible to configure such that, when the fixing releasing mechanism (50 (70, 90)) has been set to a fixed state, there is generated an impact sound due to contact between the base (20) and the first link portion (52a (82a, 92a, 132a)) or the second link portion (52b (92b, 112b, 132b)).

Still further, in the electric trimmer (10) according to the present invention, it is possible that either of the first link portion (52a (82a, 92a, 132a)) or the second link portion (52b (92b, 112b, 132b)) is configured as an operating lever, and a convex shape (56) or a concave shape which is a marker indicating an operating place and which functions as a slip stopper, is formed on a surface of the operating lever.

Effect of the Invention

The present invention makes it possible to provide an electric trimmer comprising a new fixing releasing mechanism which improves operability by achievement of compacting, is resistant to external impact, and also has excellent maintenance properties.

MODE FOR CARRYING OUT THE INVENTION

A preferred embodiment for carrying out the present invention will be described below using the drawings. Note that the following embodiment does not limit the inventions according to each of the claims, and the combinations of features described in the embodiment are not all necessarily essential for the means for solving the problem of the invention.

Figure 1:
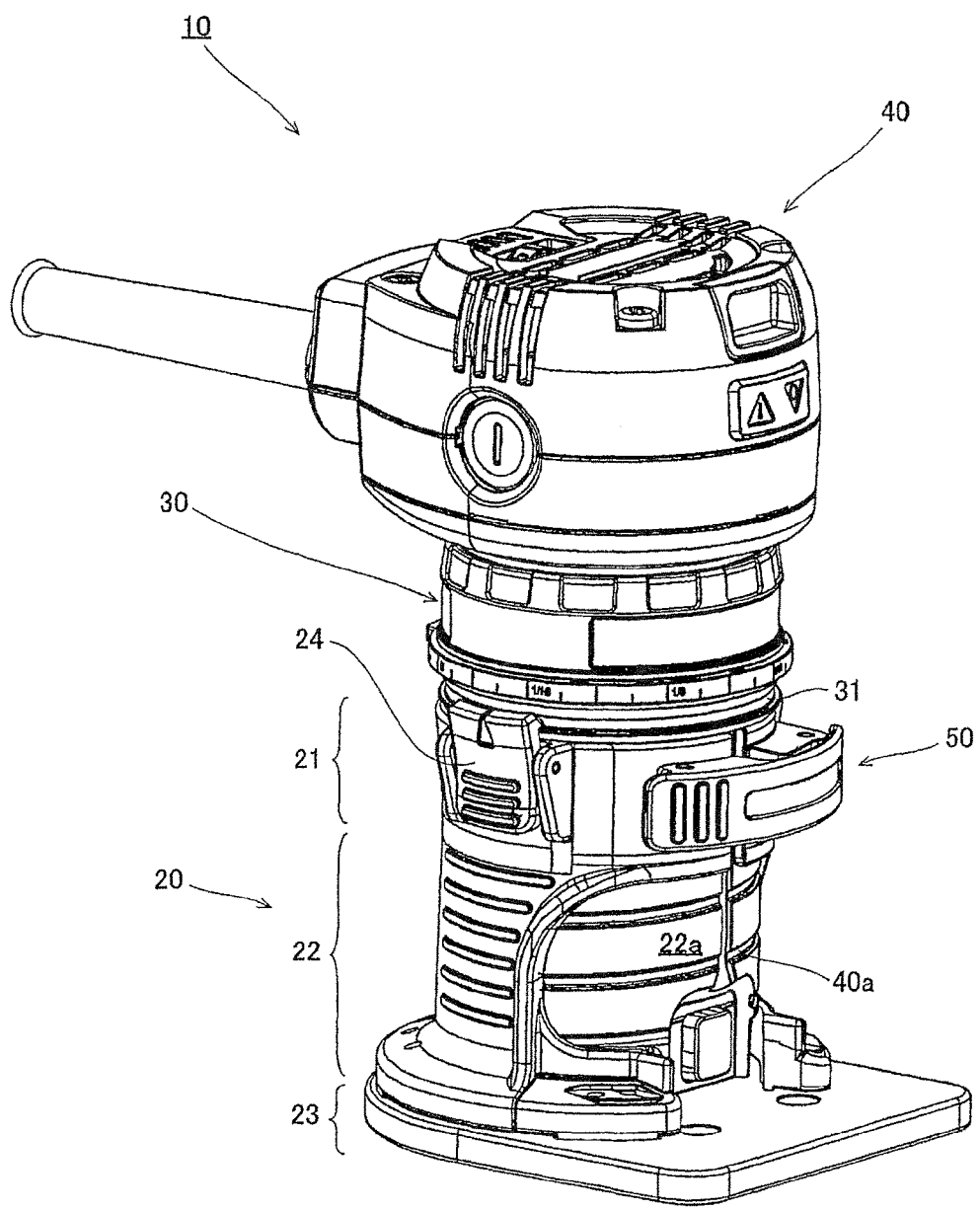
FIG. 1 is a perspective view of external appearance of an electric trimmer according to the present embodiment.
Figure 2:
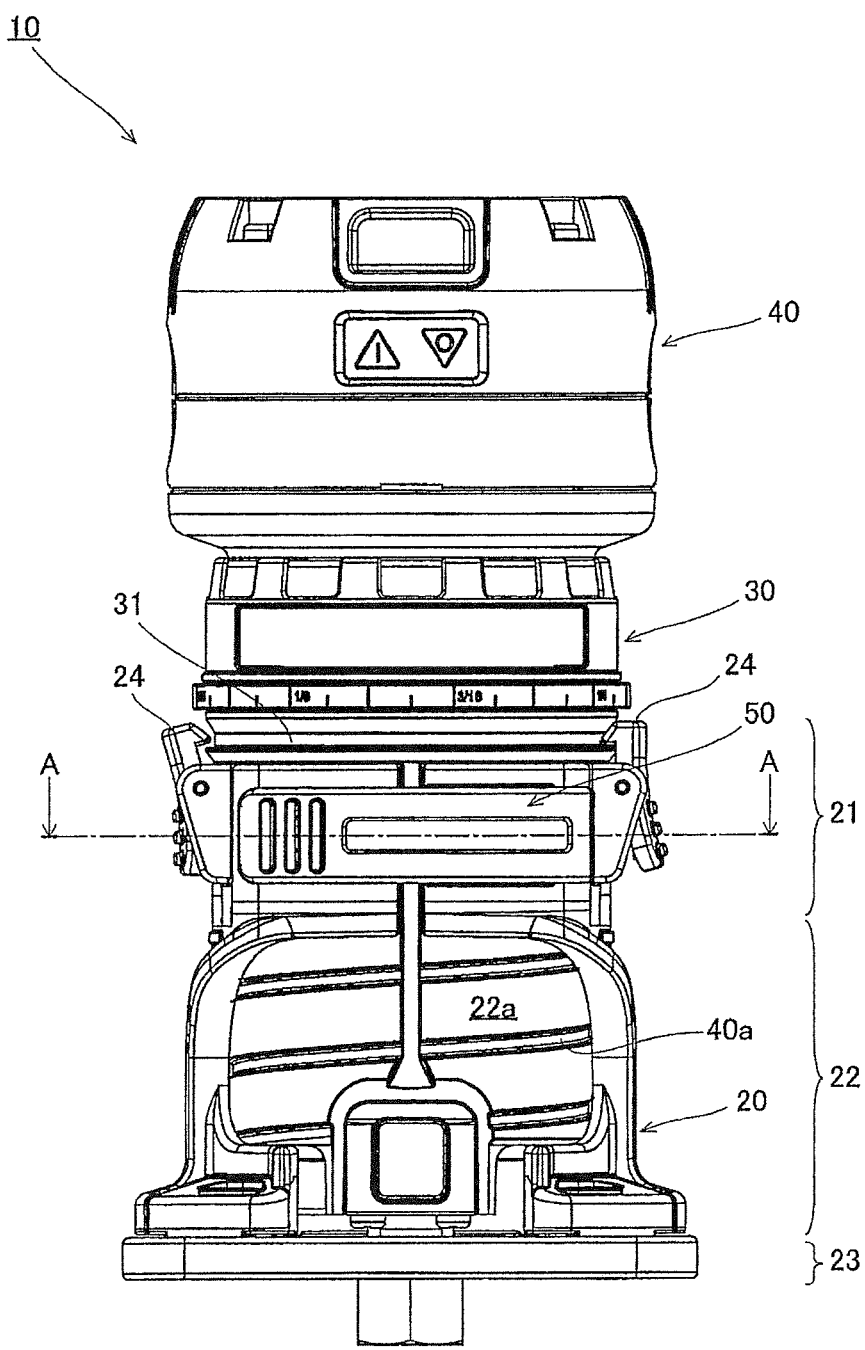
FIG. 2 is an elevation view of external appearance of the electric trimmer according to the present embodiment.
Figure 3:
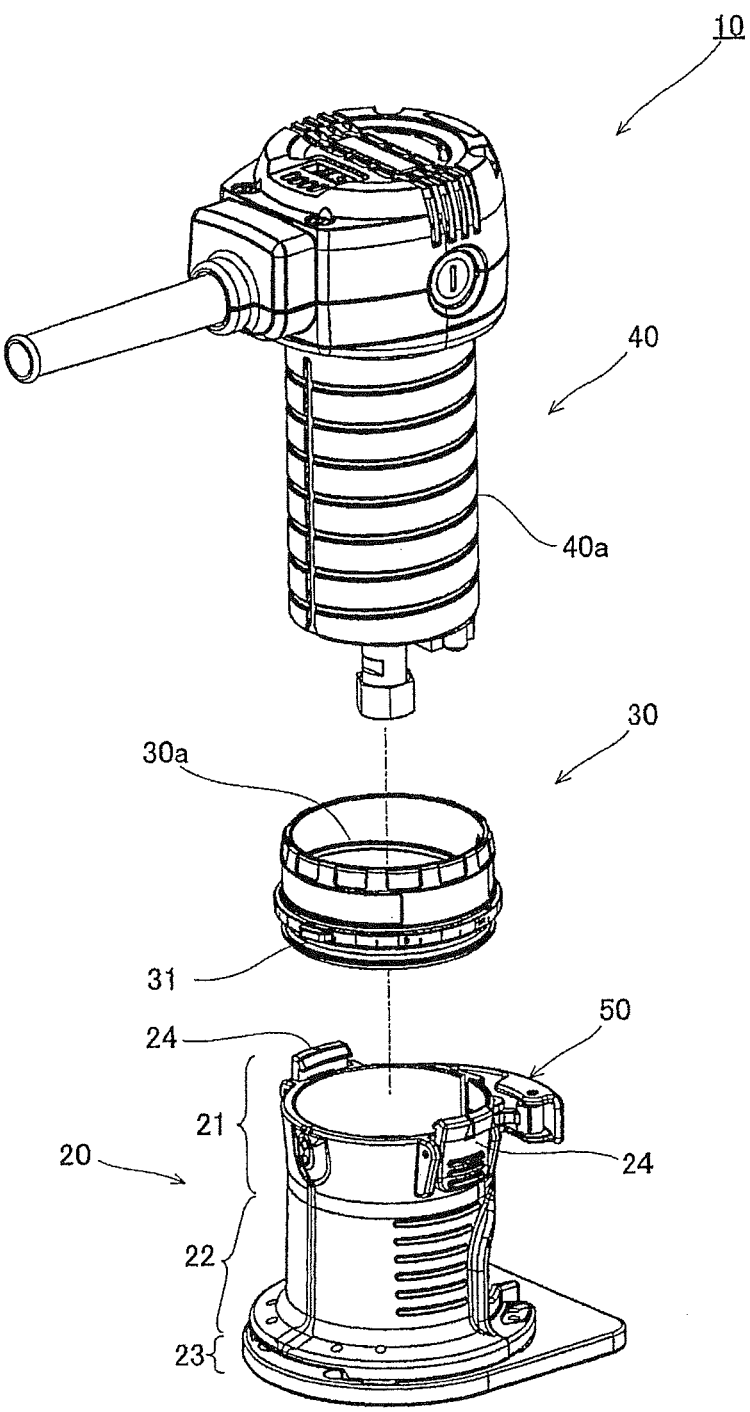
FIG. 3 is an exploded perspective view showing, disassembled, main configuration members of the electric trimmer according to the present embodiment.
Figure 4:
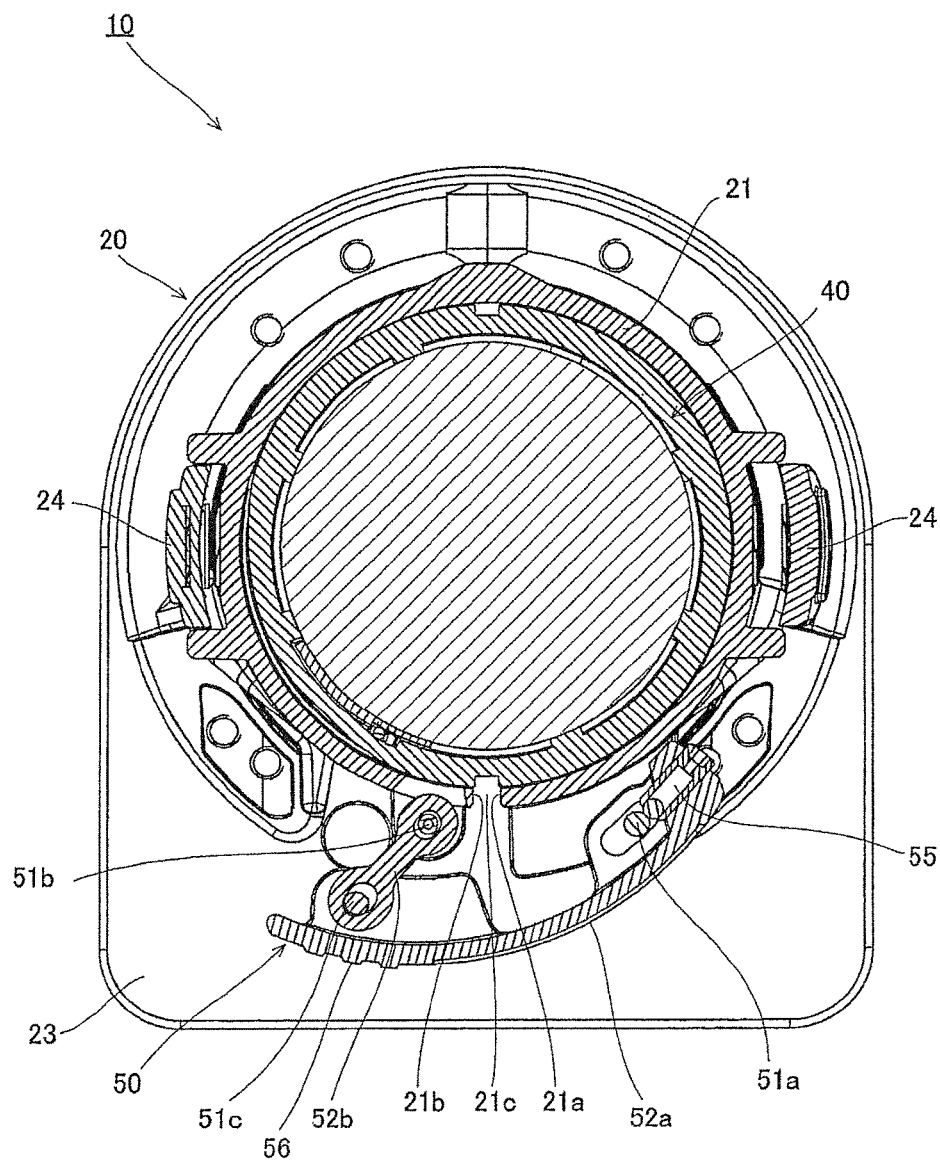
FIG. 4 is a cross-sectional view showing a place of an A-A cross-sectional line in FIG. 2, and specifically shows a released state of a fixing releasing mechanism.
Figure 5:
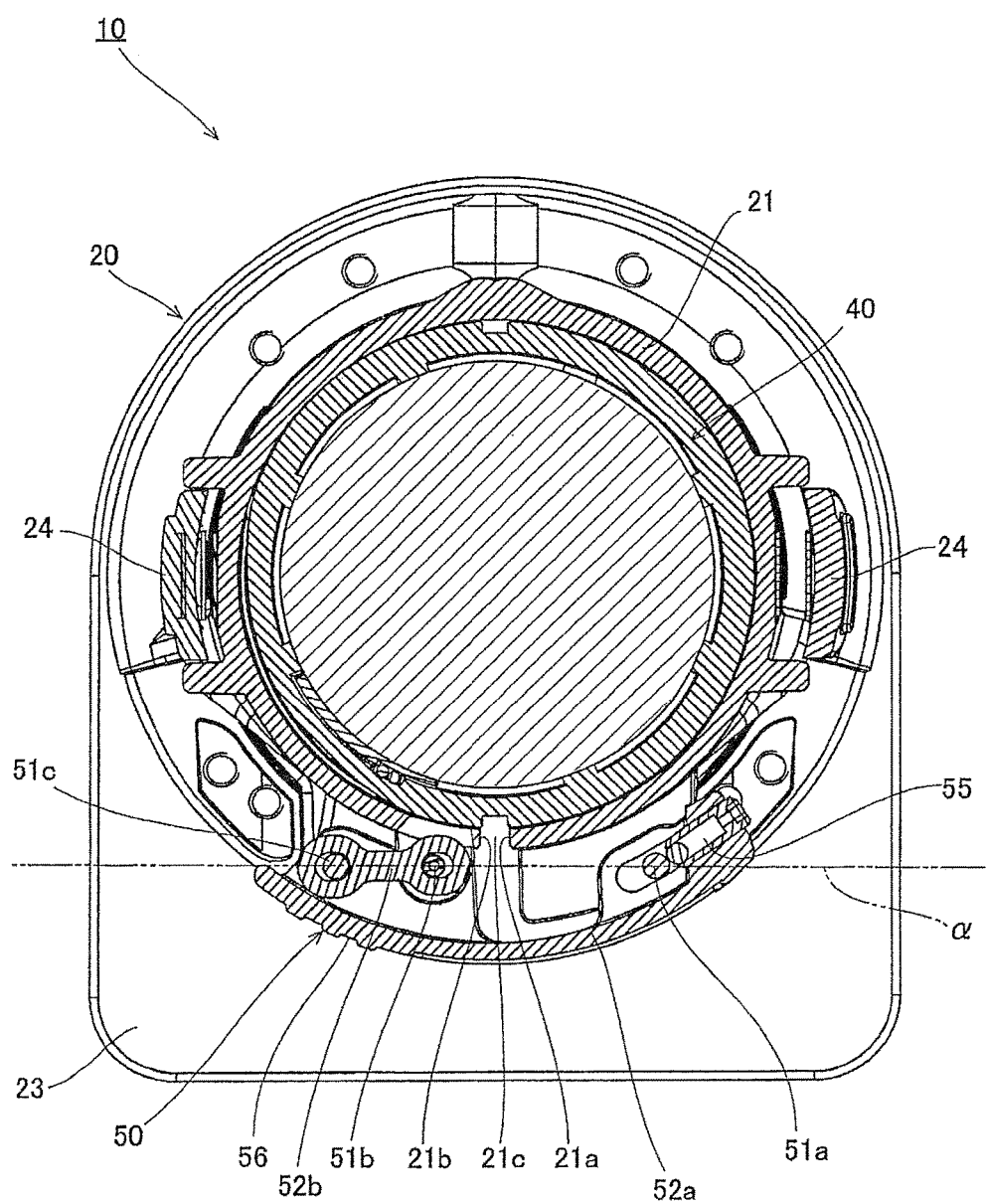
FIG. 5 is a cross-sectional view showing the place of the A-A cross-sectional line in FIG. 2, and specifically shows a state of a dead point at which there occurs transition from the released state to a fixed state of the fixing releasing mechanism.
Figure 6:
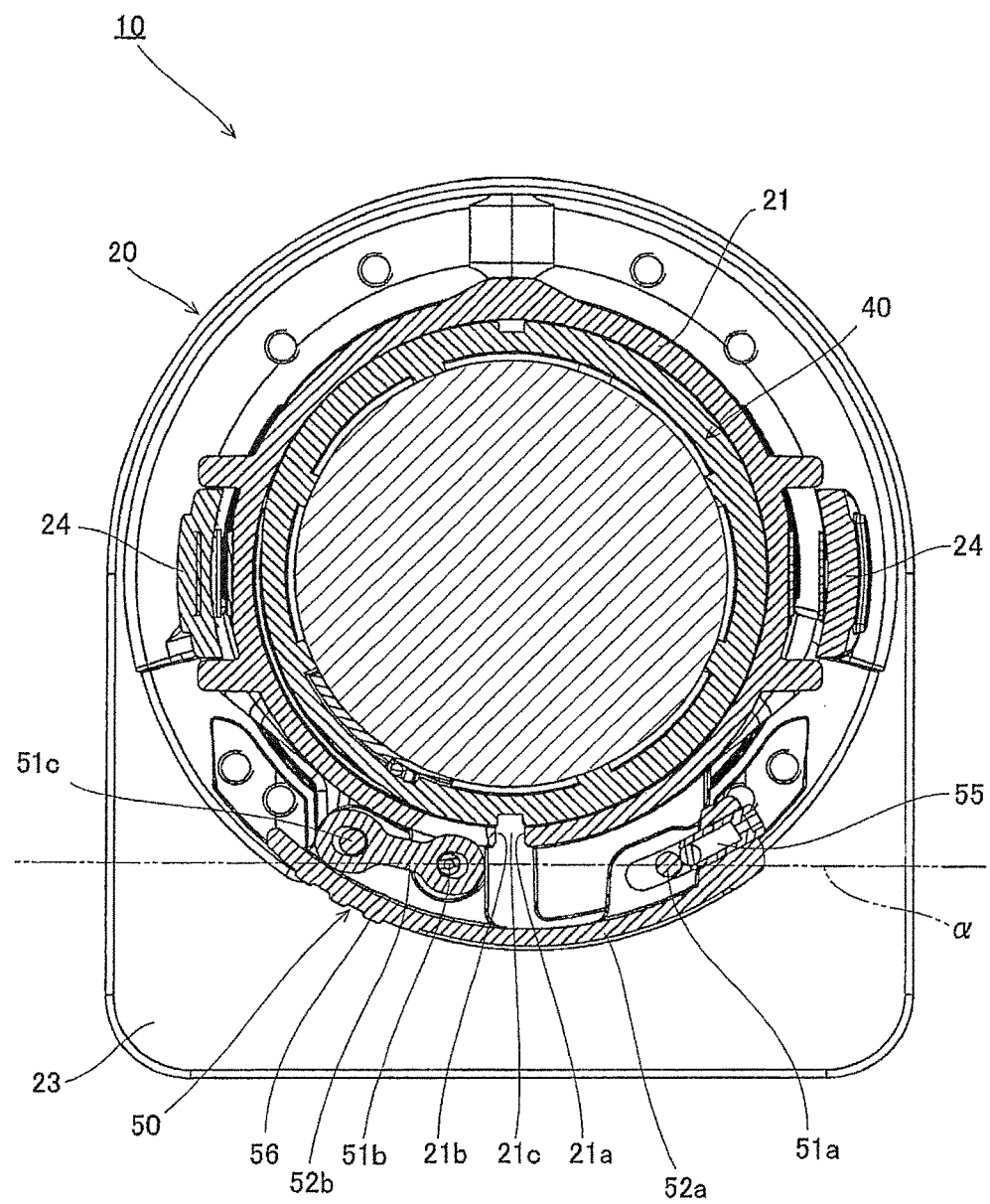
FIG. 6 is a cross-sectional view showing the place of the A-A cross-sectional line in FIG. 2, and specifically shows the fixed state of the fixing releasing mechanism.

First, an overall schematic configuration of an electric trimmer according to the present embodiment will be described using FIGS. 1 to 6. Now, FIG. 1 is a perspective view of external appearance of the electric trimmer according to the present embodiment, FIG. 2 is an elevation view of external appearance of the electric trimmer according to the present embodiment, and FIG. 3 is an exploded perspective view showing, disassembled, main configuration members of the electric trimmer according to the present embodiment. In addition, FIGS. 4 to 6 are cross-sectional views showing a place of an A-A cross-sectional line in FIG. 2, and specifically, FIG. 4 shows a released state of a later-mentioned fixing releasing mechanism, FIG. 5 shows a state of a dead point at which there occurs transition from the released state to a fixed state of the fixing releasing mechanism, and FIG. 6 shows the fixed state of the fixing releasing mechanism.

As shown in FIGS. 1 to 3, an electric trimmer 10 according to the present embodiment is configured to mainly include: a base 20 acting as a reference; a ring 30 disposed at an upper end position of the base 20 and only allowed to undergo rotatory motion at the upper end position; and a trimmer main body 40 that by comprising on its outer peripheral surface a thread groove 40a that threads with a screw thread 30a formed on an inner peripheral surface of the ring 30, is configured capable of sliding movement in an axial direction of the base 20 according to the rotatory motion of the ring 30.

The base 20 is a member that by being employed mounted on a material to be cut, acts as a reference of the electric trimmer 10, and is a member that grasps the trimmer main body 40 to be capable of sliding movement in an axial direction (for example, an up-down direction of a plane of paper in FIGS. 1 to 3). A gripper 21 is formed in an upper region of the base 20 so as to grasp the trimmer main body 40. This gripper 21 includes in part of its substantially cylindrical shape a slit 21c which is open in a longitudinal direction, and as shown specifically in FIGS. 4 to 6, has its cross-section formed substantially in a C shape. That is, the gripper 21 includes end portions 21a and 21b that face each other with a certain spacing in a circumferential direction, and is configured such that by adjusting the spacing of these end portions 21a and 21b, a diameter of an inner peripheral surface of the gripper 21 whose cross-section is configured substantially in a C shape changes, and a fixing holding force (clamping force) with respect to the trimmer main body 40 grasped by the gripper 21 changes.

Moreover, formed in a lower region of the base 20 are a trunk portion 22 extending in a vertical direction continuing from the gripper 21, and a base plate 23 having a plate-like shape and extending in a horizontal direction in an even lower region than the trunk portion 22. Formed on a front surface side of the trunk portion 22 is a window 22a opened along a circumferential surface in order to visually observe a bit periphery during processing. On the other hand, a peripheral edge of the base plate 23 projects further to an outer radial direction side than an outer circumference of the gripper 21 and is configured such that the electric trimmer 10 can be maintained in an upright state. In addition, formed in a central portion of the base plate 23 is an opening (not illustrated) in order for a bit to be inserted.

The ring 30 is disposed at an upper end position of the base 20 and moreover, formed on an outer peripheral surface of the ring 30 is a one-line groove 31 formed along an entire circumference. Claw tips of two tilting claws 24 installed in the upper region of the base 20 engage with this groove 31, hence the ring 30 is installed in a state of only being allowed to undergo rotatory motion at the upper end position of the base 20.

Moreover, formed on the inner peripheral surface of the ring 30 is the spiral screw thread 30a (refer to FIG. 3), and, on the other hand, formed on the outer peripheral surface of the trimmer main body 40 is the spiral thread groove 40a that corresponds to a lead angle of the screw thread 30a (refer to FIGS. 1 to 3). These screw thread 30a on the inner peripheral surface of the ring 30 and thread groove 40a on the outer peripheral surface of the trimmer main body 40 are installed threading with each other. Moreover, although not specifically illustrated, the trimmer main body 40 is provided with a mechanism that restricts rotatory motion so as to prevent operation in a rotation direction with respect to the base 20. Therefore, when the ring 30 is rotated at the upper end position of the base 20, the trimmer main body 40 undergoes sliding movement in an axial direction of the base 20 according to the rotatory motion of the ring 30. The ring 30 has a scale inscribed on its outer peripheral surface, and by a user adjusting a rotation amount of the ring 30 based on that scale, it is configured possible to adjust a sliding movement amount in the axial direction (that is, the up-down direction) of the trimmer main body 40 with respect to the base 20. Utilizing such a mechanism makes it possible to adjust a projection amount of the bit not illustrated projecting from a lower surface of the base plate 23, thereby enabling a desired processing to be performed on the material to be cut. Note that, for example, a variety of systems such as a rack-and-pinion system or a roller system can be adopted as the mechanism for adjusting the projection amount of the bit, besides the above-mentioned system.

Note that installed in the gripper 21 formed substantially in a C shape when viewed in cross-section is a fixing releasing mechanism 50 disposed so as to straddle the end portions 21a and 21b. Moreover, a configuration is adopted such that operating the fixing releasing mechanism 50 to reduce a distance between both end portions 21a and 21b of the slit 21c enables clamping of the trimmer main body 40 by the base 20 to be performed. Accordingly, next, the fixing releasing mechanism 50 according to the present embodiment will be described.

Referring to FIG. 4 regarding the fixing releasing mechanism 50 according to the present embodiment, it may be understood that the fixing releasing mechanism 50 according to the present embodiment is configured having a shape which follows an outer peripheral surface of the base. That is, the fixing releasing mechanism 50 is formed extremely compactly, hence may be said to have an external shape that contributes to improvement in operability of the electric trimmer 10.

Moreover, the fixing releasing mechanism 50 according to the present embodiment is formed as a toggle mechanism that is configured by a combination of three support points 51a, 51b, and 51c, and two links 52a and 52b. Describing more specifically the fixing releasing mechanism 50 as such a toggle mechanism, the fixing releasing mechanism 50 according to the present embodiment is configured comprising: a first support point portion 51a installed on a side of one end portion 21a of the both end portions of the slit 21c; a first link portion 52a installed tiltably with respect to the first support point portion 51a; a second support point portion 51b installed on a side of the other end portion 21b of the both end portions of the slit 21c; a second link portion 52b installed tiltably with respect to the second support point portion 51b; and a third support point portion 51c that links and connects the first link portion 52a and the second link portion 52b in a tiltable state.

In the present embodiment, the first link portion 52a is configured as an operating lever, whereas the second link portion 52b is configured as a clamp link. Moreover, the first support point portion 51a is configured as a fixed axis fixedly installed in a close vicinity of the one end portion 21a in the gripper 21, and the second support point portion 51b is configured as a fixed axis fixedly installed in a close vicinity of the other end portion 21b in the gripper 21. Furthermore, the third support point portion 51c is configured as a fixed axis fixedly installed close to a tip of the first link portion 52a.

Moreover, a connection hole of the first link portion 52a connected to the first support point portion 51a and connection holes of the second link portion 52b connected to the second support point portion 51b and the third support point portion 51c are formed by long holes, and designing these long holes by adjusting dimensions of these long holes makes it possible to adjust an operating angle amount of the first link portion 52a acting as the operating lever.

Next, operation of the fixing releasing mechanism 50 according to the present embodiment will be described.

As shown in FIG. 4, in a released state of the fixing releasing mechanism 50, the third support point portion 51c is disposed in a position most distant from the base 20, and a dimension of the slit 21c, that is, the distance between the both end portions 21a and 21b of the slit 21c is unchanged in an initial state, and a fixing grip of the trimmer main body 40 by the gripper 21 is in an unimplemented state.

As shown in FIG. 5, when the first link portion 52a acting as the operating lever is tilted from the released state shown in FIG. 4 so as to approach a base 20 side, there occurs a state where the third support point portion 51c arrives on an extended line a of a straight line configured from a two-dot chain line joining the first support point portion 51a and the second support point portion 51b. This state shown in FIG. 5 is a state of a dead point which is a boundary at which there occurs transition from the released state to a fixed state of the fixing releasing mechanism 50.

Moreover, when the first link portion 52a acting as the operating lever is further tilted from the state of the dead point shown in FIG. 5 so as to approach the base 20 side, the third support point portion 51c that has overcome the dead point further approaches the base 20 side and there occurs transition to the fixed state of the fixing releasing mechanism 50. That is, when the fixing releasing mechanism 50 undergoes transition to the state shown in FIG. 6, a distance between the first support point portion 51a and the second support point portion 51b decreases compared to a distance in the initial state, hence the dimension of the slit 21c, that is, the distance between the both end portions 21a and 21b of the slit 21c decreases and a fixing grip of the trimmer main body 40 by the gripper 21 is implemented, whereby the fixed state of the trimmer main body 40 with respect to the base 20 is achieved. Moreover, in the state shown in FIG. 6, since the third support point portion 51c has completely overcome the position of the dead point, the fixing releasing mechanism 50 can stably maintain the state shown in FIG. 6.

Note that in order to release the fixed state of the fixing releasing mechanism 50 shown in FIG. 6, it is only required to tilt the first link portion 52a acting as the operating lever so as to move away from the base 20 side, and by the third support point portion 51c completely overcoming the position of the dead point and again being disposed in a position of the kind shown in FIG. 4 where the third support point portion 51c is distant from the base 20, the released state of the fixing releasing mechanism 50 is achieved.

That concludes description of a main configuration of the fixing releasing mechanism 50 according to the present embodiment, but this fixing releasing mechanism 50 comprises further superior features.

First, in the fixing releasing mechanism 50 according to the present embodiment, the first link portion 52a acting as the operating lever is installed with an adjusting screw 55 acting as an adjusting mechanism. This adjusting screw 55 adjusts a screwing amount with respect to the first link portion 52a acting as the operating lever and is thereby configured capable of adjusting a positional relationship between the first link portion 52a and the first support point portion 51a. As a result, a relative distance of the first support point portion 51a with respect to the third support point portion 51c can be adjusted, hence it becomes possible to adjust the distance between the first support point portion 51a and the second support point portion 51b in the fixed state, whereby it becomes possible to adjust the distance between the both end portions 21a and 21b of the slit 21c in the fixed state and thereby perform adjustment of fixing holding force (clamping force) with respect to the trimmer main body 40 of the gripper 21.

In addition, the present embodiment is configured such that when the fixing releasing mechanism 50 has been set to the fixed state, the base 20 and the first link portion 52a contact each other and an impact sound is generated. Deliberately generating such an impact sound makes it possible for an operator to understand a reliable fixed state of the trimmer main body 40 by the fixing releasing mechanism 50. Note that even when such an impact sound is generated, an impact force thereof is slight, hence a malfunction to the electric trimmer 10 is never caused.

Furthermore, in the present embodiment, a convex shape 56 which is a marker indicating an operating place and which functions as a slip stopper, is formed on a surface of the first link portion 52a acting as the operating lever. The fixing releasing mechanism 50 according to the present embodiment is formed extremely compactly and has an unconventional and innovative external shape, hence there is a possibility that an operator operating this fixing releasing mechanism 50 for the first time does not understand which place of the first link portion 52a acting as the operating lever should be operated. Accordingly, in the present embodiment, it was decided to form the convex shape 56 on the surface of the first link portion 52a. The existence of such a convex shape 56 makes it possible for even an operator operating this mechanism for the first time to easily understand the operating place. In other words, the electric trimmer 10 according to the present embodiment could be said to be an electric tool of extremely high operability.

Note that the fixing releasing mechanism 50 according to the present embodiment does not include a cam mechanism of the kind of the conventional technology and has a toggle mechanism formed therein by engagement of a fixed axis and a long hole, hence can display the advantageous effect that it is difficult for abrasion to occur. Moreover, since components configuring the fixing releasing mechanism 50 can be individually replaced, the fixing releasing mechanism 50 also has excellent maintenance properties. For example, even if the adjusting screw 55 acting as the adjusting mechanism has suffered abrasion, repair is completed by replacing the adjusting screw 55 alone. The same applies also to the three support points 51a, 51b, and 51c, and the two links 52a and 52b. From the above, the present embodiment makes it possible to provide an electric trimmer comprising a new fixing releasing mechanism which improves operability by achievement of compacting, is resistant to external impact, and also has excellent maintenance properties.

That concludes description of the preferred embodiment of the present invention, but the technical scope of the present invention is not limited to the scope recited in the above-described embodiment. A variety of modifications or improvements may be added to the above-described embodiment.

Figure 7:
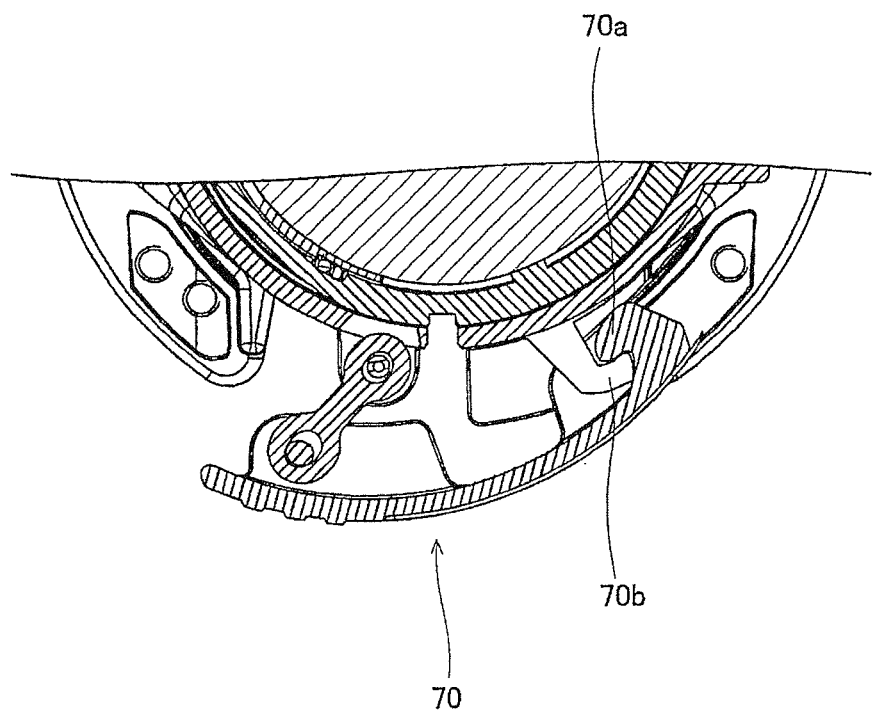
FIG. 7 is a view showing one example of a variety of modified forms adoptable by the electric trimmer according to the present invention.

For example, in the above-mentioned embodiment, the first link portion 52a acting as the operating lever and the first support point portion 51a installed on the side of one end portion 21a were connected by a long hole formed in the first link portion 52a, but in the present invention, another connecting means can be adopted. Specifically, by forming a hook shape 70a with respect to the first link portion and also configuring a hook shape 70b engageable with the hook shape 70a for the first support point portion as shown in FIG. 7, a fixing releasing mechanism 70 similar to that of the above-mentioned embodiment can be achieved.

Figure 8:
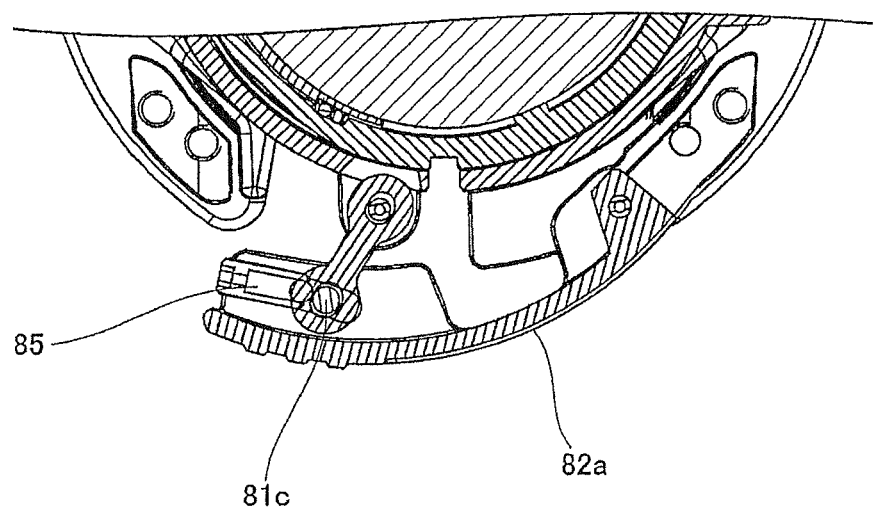
FIG. 8 is a view showing one example of a variety of modified forms adoptable by the electric trimmer according to the present invention.

In addition, the above-mentioned embodiment exemplified the case where the adjusting screw 55 acting as the adjusting mechanism was installed at a place of connection with the first support point portion 51a in the first link portion 52a acting as the operating lever. However, a place of installation of the adjusting mechanism according to the present invention is not limited to the case of the above-mentioned embodiment. For example, as shown in FIG. 8, an adjusting screw 85 may be installed at a place of connection with a third support point portion 81c in a first link portion 82a.

Figure 9:
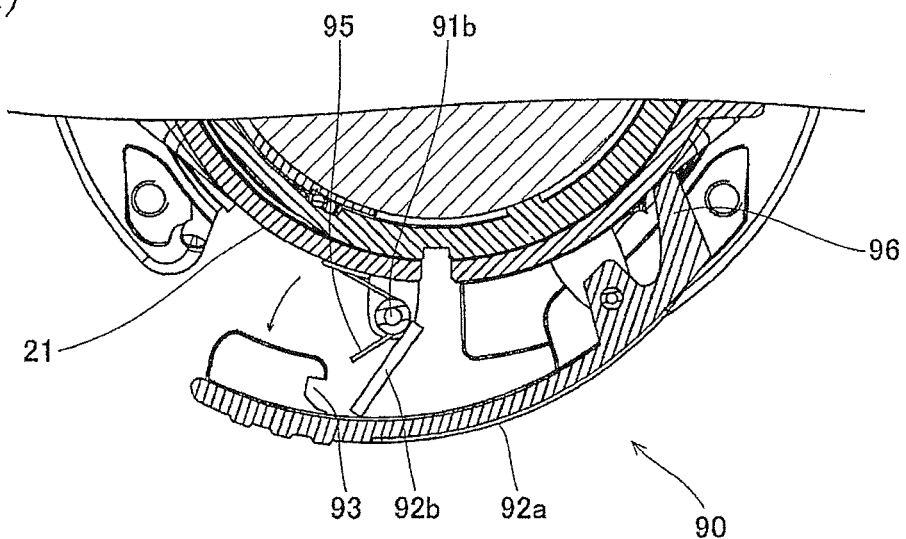
FIG. 9 is a view showing one example of a variety of modified forms adoptable by the electric trimmer according to the present invention.
Figure 9:
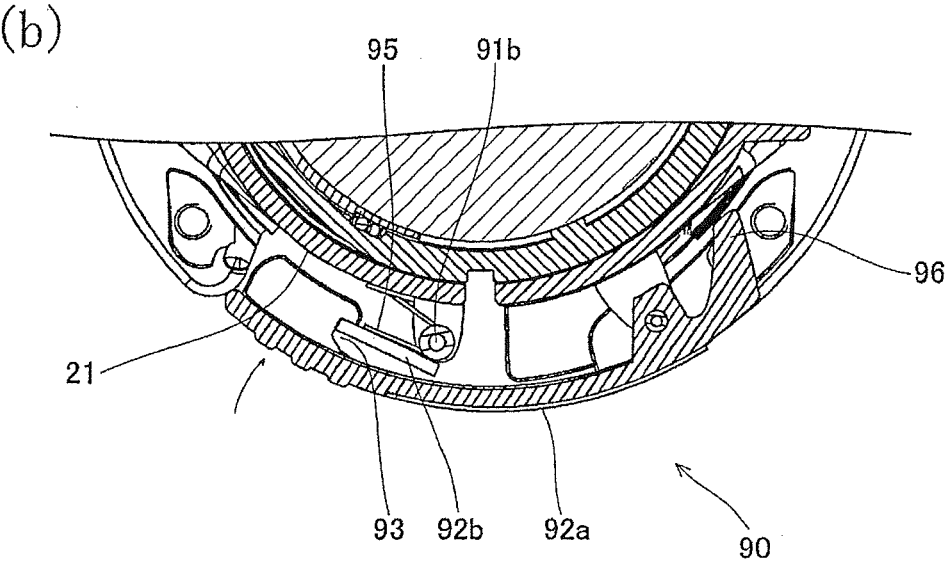

Moreover, in the above-mentioned embodiment, in the released state, the first link portion 52a acting as the operating lever was in a free state, without being restricted. Therefore, it is conceivable that when the electric trimmer 10 receives an external force, the first link portion 52a in the released state gives rise to rattling in an allowable range of the free state. Accordingly, by installing a torsion spring 95 at a position of a second support point portion 91b and continuously loading a spring force between the gripper 21 and a second link portion 92b as shown in FIG. 9, for example, a position of a first link portion 92a in the released state becomes constant. At this time, a configuration may be adopted such that the second link portion 92b is configured as a rod-like member that turns with the second support point portion 91b as its turning center and is engaged with an engaging hole 93 formed at a tip of the first link portion 92a thereby achieving the fixed state (refer to a state of the partial drawing (b) from the partial drawing (a) in FIG. 9). Moreover, in order to define a position of the first link portion 92a in the released state, a back end of the first link portion 92a preferably has a rotation stopping shape 96 formed therein. Providing these configurations makes it possible to achieve a fixing releasing mechanism 90 similar to that of the above-mentioned embodiment and also makes it possible to overcome rattling of the first link portion 92a in the released state.

Figure 10:
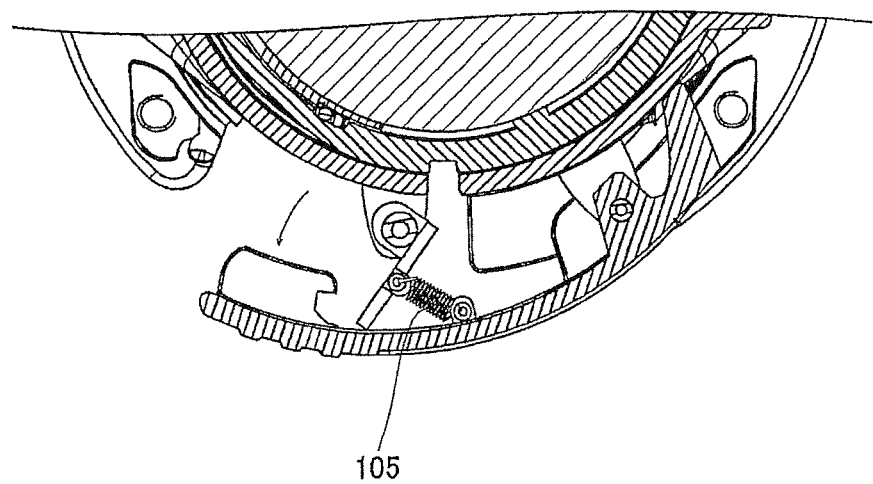
FIG. 10 is a view showing one example of a variety of modified forms adoptable by the electric trimmer according to the present invention.

Note that it is also possible to adopt a coil spring 105 of the kind shown in FIG. 10 as the torsion spring 95 shown in FIG. 9. Similar operational advantages to those of the modified example exemplified in FIG. 9 can be obtained even with the coil spring 105 exemplified in FIG. 10.

Figure 11:
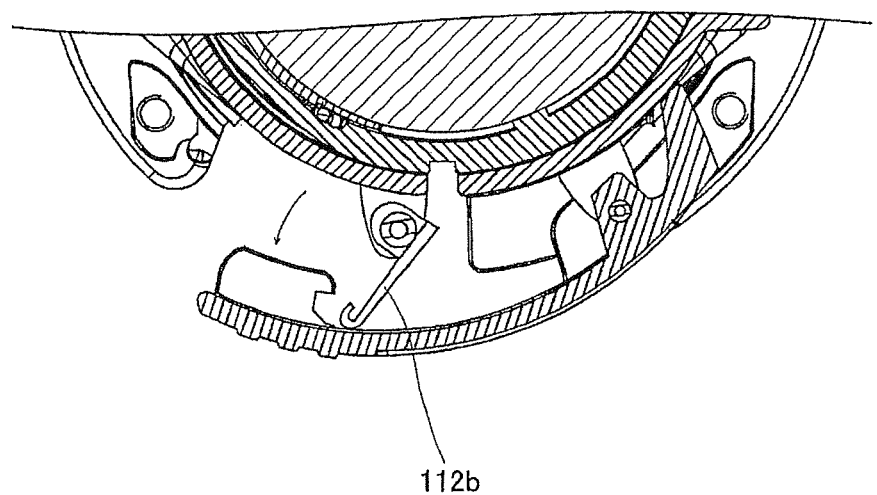
FIG. 11 is a view showing one example of a variety of modified forms adoptable by the electric trimmer according to the present invention.

Furthermore, imparting of an elastic force to the first link portion acting as the operating lever is not limited to a method of adding a spring member unit such as the torsion spring 95 or coil spring 105 of the kinds shown in FIGS. 9 and 10. For example, configuring a second link portion 112b itself as an elastic body as shown in FIG. 11 also makes it possible for the second link portion and the elastic body to be configured by a single member. Similar operational advantages to those of the modified examples shown in FIGS. 9 and 10 can be obtained even with the configuration shown in FIG. 11.

Figure 12:
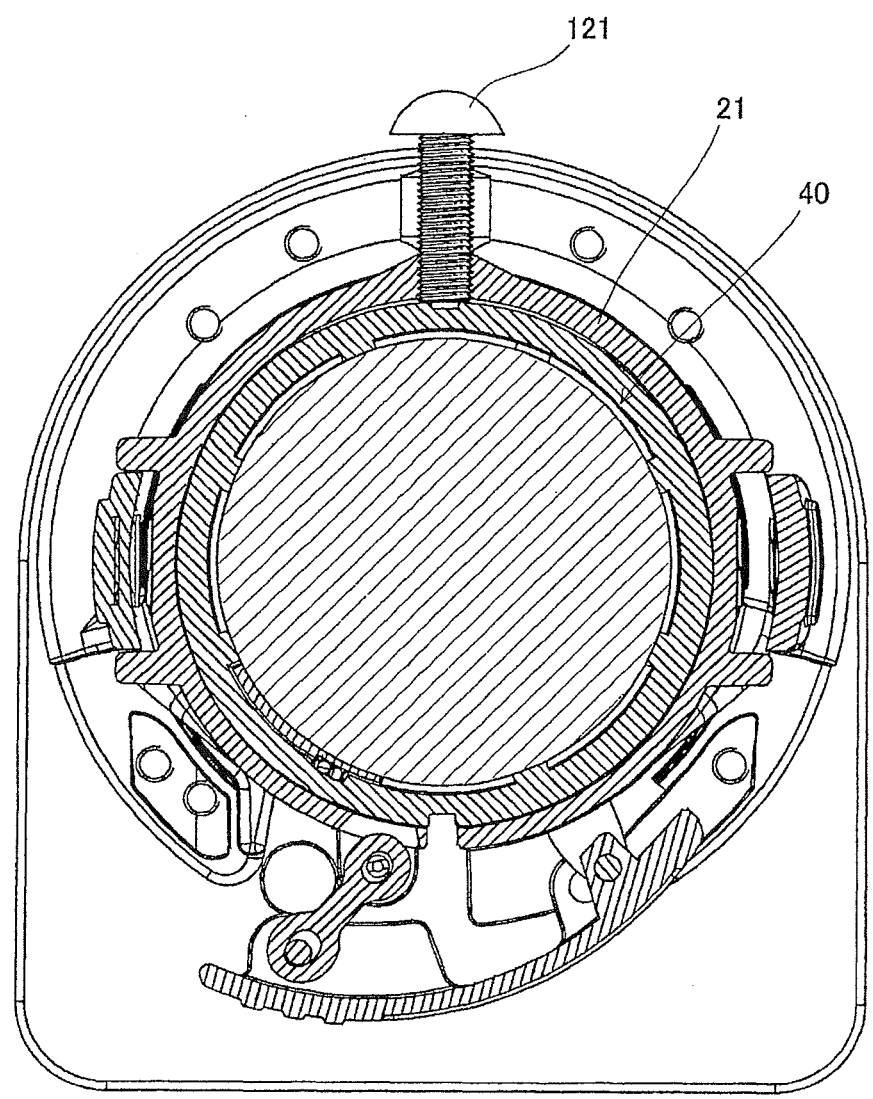
FIG. 12 is a view showing one example of a variety of modified forms adoptable by the electric trimmer according to the present invention.

Furthermore, in the above-mentioned embodiment, only the fixing releasing mechanism 50 was employed in adjustment of the fixing holding force (clamping force) with respect to the trimmer main body 40 grasped by the gripper 21. However, besides employing the fixing releasing mechanism 50 unit, it is also possible to provide a mechanism that assists the fixing releasing mechanism 50 for adjustment of the fixing holding force (clamping force) between the gripper 21 and the trimmer main body 40. For example, installing an adjustment-dedicated screw 121 to the gripper 21 and adjusting a screwing amount with respect to the gripper 21 of this screw 121 as shown in FIG. 12 makes it possible to directly adjust a positional relationship between the gripper 21 and the trimmer main body 40. Employing such an adjustment-dedicated screw 121 in an auxiliary manner makes it possible for adjustment of the fixing holding force (clamping force) between the gripper 21 and the trimmer main body 40 to be suitably performed.

Figure 13:
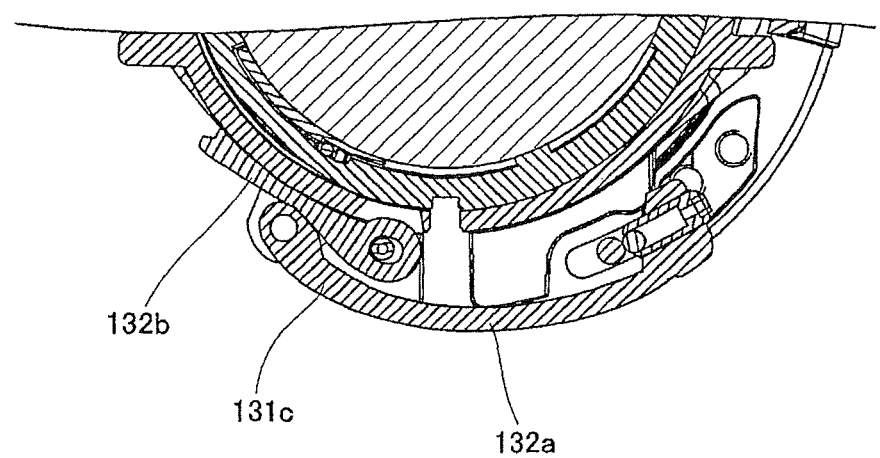
FIG. 13 is a view showing one example of a variety of modified forms adoptable by the electric trimmer according to the present invention.

Furthermore, the above-mentioned embodiment exemplified the case where the first link portion 52a is configured as an operating lever, whereas the second link portion 52b is configured as a clamp link. However, in the present invention, as exemplified in FIG. 13, for example, it is also possible for a second link portion 132b to be configured as the operating lever, whereas a first link portion 132a is configured as the clamp link. In the case of the modified example exemplified in FIG. 13, the above-described configuration is achieved by forming a third support point portion 131c on a side of the second link portion 132b and forming a long hole connecting with the third support point portion 131c on a side of the first link portion 132a. In other words, the modified example shown in FIG. 13 demonstrates that in the present invention, all kinds of modified forms can be adopted while obtaining similar operational advantages to those of the above-mentioned embodiment, simply by contriving shapes of the first link portion and the second link portion, without changing a positional relationship of the three support points and the two links.

Moreover, the above-mentioned embodiment exemplified the case where the convex shape 56 which is a marker indicating the operating place and which functions as a slip stopper, is formed on the surface of the first link portion 52a acting as the operating lever. However, this convex shape 56 may adopt another shape provided that similar operational advantages can be obtained. For example, similar operational advantages to those of the above-mentioned embodiment can be obtained even if a concave shape is formed.

Note that regarding the present embodiment shown in FIGS. 1 to 6 and the modified examples exemplified in FIGS. 7 to 13, only characteristic places were described in each of the drawings, and particularly regarding the modified examples, a description of members identical or similar to the previously described members was omitted.

Moreover, the scope of the present invention is not limited only to forms depicted in each of the drawings, and the present invention includes all kinds of combinations of the above-mentioned form examples. It is clear from descriptions of the claims that such modified or improved forms may also be included in the technical scope of the present invention.

DESCRIPTION OF REFERENCE NUMERALS 10 electric trimmer
20 base
21 gripper
21a, 21b end portion
21c slit
22 trunk portion
22a window
23 base plate
24 tilting claw
30 ring
30a screw thread
31 groove
40 trimmer main body
40a thread groove
50, 70, 90 fixing releasing mechanism
51a first support point portion
51b, 91b second support point portion
51c, 81c, 131c third support point portion
52a, 82a, 92a, 132a first link portion
52b, 92b, 112b, 132b second link portion
55, 85 adjusting screw
56 convex shape
70a, 70b hook shape
93 engaging hole 95 torsion spring
96 rotation stopping shape
105 coil spring
121 screw

The invention claimed is:

1. An electric trimmer, comprising: a base acting as a reference; and a trimmer main body configured capable of sliding movement in an axial direction of the base,
the base comprising a slit that extends in the axial direction and is open, and the base also comprising a fixing releasing mechanism disposed so as to straddle both end portions of the slit,
operating the fixing releasing mechanism to reduce a distance between the both end portions of the slit causing clamping of the trimmer main body by the base to be performed, and
the fixing releasing mechanism being formed as a toggle mechanism that is configured by a combination of three support points and two links, and the fixing releasing mechanism being configured having a shape which follows an outer peripheral surface of the base.

2. The electric trimmer according to claim 1, wherein the fixing releasing mechanism comprises:
a first support point portion installed on a side of one end portion of the both end portions of the slit;
a first link portion installed tiltably with respect to the first support point portion;
a second support point portion installed on a side of the other end portion of the both end portions of the slit;
a second link portion installed tiltably with respect to the second support point portion; and
a third support point portion that links and connects the first link portion and the second link portion in a tiltable state, and wherein
in a released state of the fixing releasing mechanism, the third support point portion can be disposed in a position most distant from the base,
when the first link portion or the second link portion is tilted so as to approach the base and the third support point portion has arrived on an extended line of a straight line joining the first support point portion and the second support point portion, a dead point at which there occurs transition from the released state to a fixed state of the fixing releasing mechanism is reached, and
further tilting the first link portion or the second link portion from a position of the dead point so as to approach the base causes transition to the fixed state of the fixing releasing mechanism to occur.

3. The electric trimmer according to claim 2, further comprising:
an adjusting mechanism for adjusting a relative distance between the third support point portion and the first support point portion or the second support point portion.

4. The electric trimmer according to claim 2, wherein a configuration is adopted such that, when the fixing releasing mechanism has been set to a fixed state, there is generated an impact sound due to contact between the base and the first link portion or the second link portion.

5. The electric trimmer according to claim 2, wherein either of the first link portion or the second link portion is configured as an operating lever, and
a convex shape or a concave shape which is a marker indicating an operating place and which functions as a slip stopper, is formed on a surface of the operating lever.

* * * * *